(No Model.)

C. W. STICKNEY.
ROCK DRILL.

No. 270,613. Patented Jan. 16, 1883.

Witnesses:
D. F. Skeleher.
Ed. F. Guzman

Inventor:
Charles W. Stickney

UNITED STATES PATENT OFFICE.

CHARLES W. STICKNEY, OF WASHINGTON, DISTRICT OF COLUMBIA.

ROCK-DRILL.

SPECIFICATION forming part of Letters Patent No. 270,613, dated January 16, 1883.

Application filed September 21, 1882. (No model.)

*To all whom it may concern:*

Be it known that I, CHARLES W. STICKNEY, a citizen of the United States, residing at Washington, in the District of Columbia, have invented certain new and useful Improvements in Rock-Drills, of which the following is a specification, reference being had therein to the accompanying drawings.

My invention relates to the preparation of a composition for rock-drills formed of aluminium, oxygen, and a metal, such as iron, which can be conveniently cast to form a drill of exceeding hardness.

Figure 1:
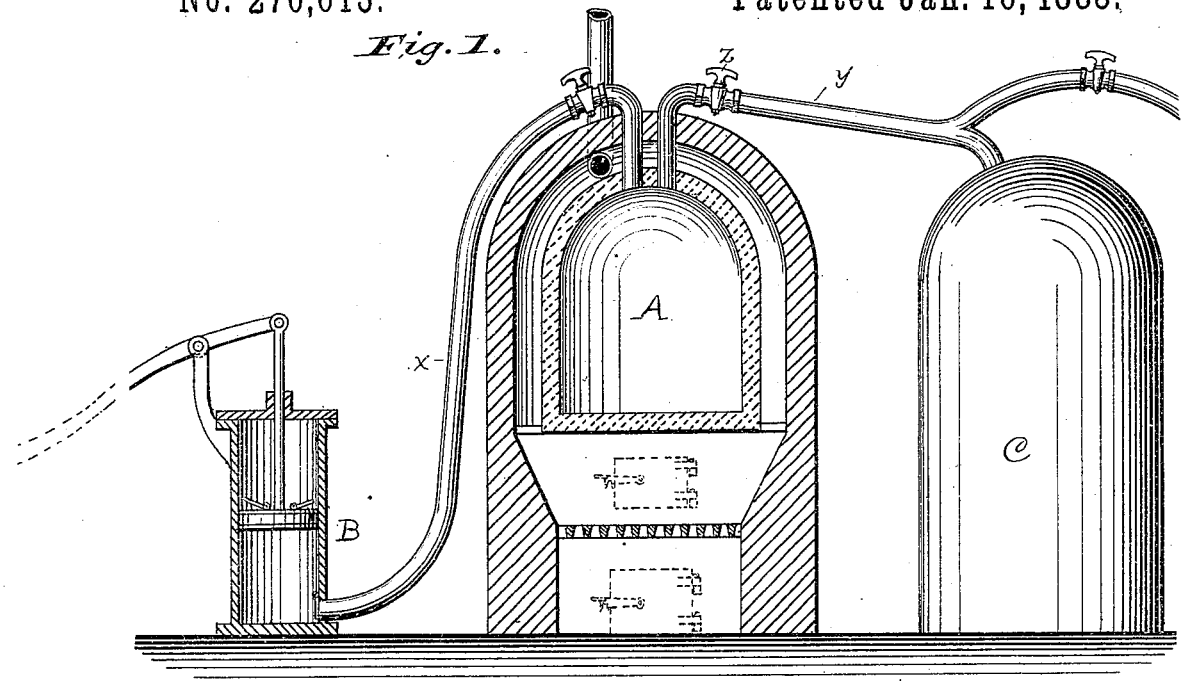
Figure 2:
Figure 3:
Figure 4:

Figure 1 represents a furnace connected by pipes with an air-pump, and a reservoir of oxygen under pressure for combining pure aluminium with pure oxygen. Fig. 2 shows the drill formed of the composition by a mold. Fig. 3 shows another drill formed of strips of artificial aluminic oxide in vertical form, prepared as hereinafter stated. Fig. 4 shows another drill having strips, as aforesaid, arranged spirally.

I connect an air-tight furnace, A, by a pipe, $x$, with an air-pump, B, on one side, and by another pipe, $y$, with a reservoir, C, in which I have pure oxygen under pressure. In the furnace I place thin strips, plates, or bits of aluminium, (metallic.) I exhaust the air from the furnace and heat the aluminium red-hot. I suddenly let in the condensed oxygen by a stop-cock, $z$. The metal and oxygen immediately unite, forming a composition harder than native corundum or any known substance except the diamond. I take any metal, preferably cast-iron, and bring it to the molten state. I break the composition, made as aforesaid, into fragments or coarse sand by pounding, and mix as much with the molten metal as it will carry and still run easily, and cast the composition in a cylindrical mold, either solid or with a hole in the center, to form a drill. As soon as the metal sets its hardness may be increased by plunging into cold water. The same thing may be also accomplished by cutting the metallic aluminium into narrow strips, which retain the same shape after combination with the oxygen, and placing these strips in the mold before casting the metal.

I am aware that alumina or corundum—an impure oxide of aluminium as found in the native state mixed with other minerals which decrease its hardness—has been embedded in metal for use as a drilling-tool. I do not claim this.

I claim in the manufacture of rock-drills—

1. A drilling-tool the body of which is composed of iron or other metal, as described, having embedded therein pieces of artificially-oxidized aluminium, substantially as set forth.

2. A drilling-tool the body of which is composed of iron or other metal, as described, having particles of artificially-oxidized aluminium interspersed through it, substantially as described.

In testimony whereof I affix my signature in presence of two witnesses.

CHARLES W. STICKNEY.

Witnesses:
 LLOYD F. KELEHER,
 EDMOND BRODHAG.